United States Patent
Geary et al.

(10) Patent No.: US 10,503,212 B2
(45) Date of Patent: Dec. 10, 2019

(54) REMOVABLE ACCESS PANEL

(71) Applicant: Lenovo (Singapore) Pte. Ltd., Singapore (SG)

(72) Inventors: Matthew Joseph Geary, Raleigh, NC (US); Jason Pratt Parrish, Raleigh, NC (US); Wesley Abram Luttrell, Raleigh, NC (US); Daniel Jordan Schantz, Raleigh, NC (US); Thomas John Sluchak, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 51 days.

(21) Appl. No.: 15/158,027

(22) Filed: May 18, 2016

(65) Prior Publication Data
US 2017/0336833 A1 Nov. 23, 2017

(51) Int. Cl.
*G06F 1/16* (2006.01)
*H05K 5/00* (2006.01)
*H05K 7/00* (2006.01)

(52) U.S. Cl.
CPC .................... *G06F 1/1656* (2013.01)

(58) Field of Classification Search
CPC .... G06F 1/1679; G06F 1/1656; G06F 1/1632; G06F 1/1633; G06F 1/1613
USPC .............. 361/679.41–679.44, 679.57, 679.6, 361/679.55–679.58; 248/370; 73/116.01
See application file for complete search history.

(56) References Cited

U.S. PATENT DOCUMENTS

| | | | | |
|---|---|---|---|---|
| 6,119,184 A * | 9/2000 | Takahama | ............. | G06F 1/1632 361/679.4 |
| 6,296,334 B1 * | 10/2001 | Liao | ............. | G06F 1/181 292/128 |
| 6,935,661 B1 * | 8/2005 | Farnsworth | ......... | E05B 65/0057 292/120 |
| 7,835,150 B2 * | 11/2010 | Degner | ................ | G06F 1/1616 361/679.58 |
| 8,107,237 B2 * | 1/2012 | Xu | ............. | H04M 1/0262 361/679.58 |
| 8,424,933 B2 * | 4/2013 | Xu | ......... | G06F 1/1679 292/137 |
| 8,454,060 B2 * | 6/2013 | Wu | ........ | G06F 1/1656 292/116 |
| 8,556,303 B2 * | 10/2013 | Rajagopal | ............. | E05C 3/122 292/11 |
| 8,833,807 B2 * | 9/2014 | Liu | ......... | G06F 1/1656 292/194 |
| 9,092,200 B2 * | 7/2015 | Richard | ................ | F16M 11/10 |
| 9,198,311 B2 * | 11/2015 | Senatori | ............... | G06F 1/1633 |
| 9,632,540 B2 * | 4/2017 | Senatori | ............... | G06F 1/1616 |
| 9,983,631 B2 * | 5/2018 | Senatori | ............... | G06F 1/1633 |
| 2003/0063432 A1 * | 4/2003 | Farrow | ................ | G06F 1/1601 361/679.02 |
| 2006/0187194 A1 * | 8/2006 | Chong | ................ | G06F 1/1616 345/156 |

(Continued)

*Primary Examiner* — Anthony M Haughton
(74) *Attorney, Agent, or Firm* — Ference & Associates LLC (57) ABSTRACT

One embodiment provides am information handling device, comprising: a housing, the housing comprising an access panel; the access panel comprising a plurality of locking mechanisms; wherein removal of the access panel requires activating each of the plurality of locking mechanism substantially simultaneously. Other aspects are described and claimed.

20 Claims, 5 Drawing Sheets

(56) References Cited

U.S. PATENT DOCUMENTS

2010/0091454 A1* 4/2010 Degner ............... G06F 1/1616
361/679.58
2012/0257350 A1* 10/2012 Chen .................. G06F 1/1616
361/679.55

* cited by examiner

REMOVABLE ACCESS PANEL

BACKGROUND

Electronic devices (e.g., computers, tablets, smartphones, etc.) allow users to perform a large variety of tasks more efficiently and easier than ever. Due to this fact, almost every work place in the modern world involves the use of a large number of electronic devices. For example, in a typical office setting, each employee will have their own work station device (e.g., desktop computer, laptop computer, tablet, etc.). Although this technological advancement is viewed positively overall, it is not without drawbacks.

One such drawback is that all of the equipment must be maintained. In a large corporation, this can require an entire team of technical specialists to keep all the electronic devices working properly with each other and the larger network/internet as a whole. One of the most time consuming duties of an information technology specialist is system upgrades. System upgrades can come in the form of software and/or hardware, and each presents a unique challenge. In the case of hardware upgrades, it can be time consuming not only during the actual upgrade of the device, but also in the disassembly and reassembly phase. Thus, increasing the ease and speed of accessing the vital components of an electronic device could greatly reduce the time required and thus the overhead costs of a hardware upgrade.

BRIEF SUMMARY

In summary, one aspect provides an information handling device, comprising: a housing, the housing comprising an access panel; the access panel comprising a plurality of locking mechanisms; wherein removal of the access panel requires activating each of the plurality of locking mechanism substantially simultaneously.

Another aspect provides an information handling device, comprising: a housing, the housing comprising a first portion and a second portion; the second portion comprising a plurality of locking mechanisms; wherein removal of the access second portion 1 requires activating each of the plurality of locking mechanism substantially simultaneously.

A further aspect provides a method, comprising: forming a housing comprising an access panel; and attaching the access panel to the housing via a plurality of locking mechanisms; wherein removal of the access panel requires activating each of the plurality of locking mechanism substantially simultaneously.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As discussed herein, the upgrading process of electronic devices can be complex. This is because as devices shrink in size, they become more and more complex on the inside. In order to fit all of the amazing technology into these small packages, design engineers are often required to make difficult decisions regarding item location. Many times, the ability to access the internal components of the device must take a back seat to ensuring proper performance and compact size.

Typically, portable electronic devices are comprised of electronic components enclosed in a protective outer case (e.g., metal, glass, plastic, or a combination of the three). In many cases, these outer cases are held together by a series of screws in order to ensure a secure housing. Thus, in order to perform even minor service to the internal components of a device, a user or technician must remove these screws (often 5, 10, or more) and then pry the cover apart. This can be even more complex in the case of modular devices, such as a laptop computer. Removing the outer shell of a laptop can be a very difficult task especially when trying to work around an attached monitor.

Removing screws is a time consuming and energy intensive process. When this slow and energy intensive process is scaled across a large enterprise, tasks that should be simple like swapping one or more DIMMs of RAM or simply removing a hard drive may turn into hours and hours of work. Beyond that, there is the risk of a lost or stripped screw that can make the fix impossible. Thus, a solution is needed that can minimize the time and inconvenience of opening and/or removing these covers, while still providing a secure and protective enclosure.

Rather than using screws, an embodiment may use a series of sliding clasps to ensure the covers remain together or secure an access panel in place on the housing. The system may then be paired with a custom jig intended to open all the clasps simultaneously (substantially simultaneously). The custom jig may also directly attach to the cover and/or access panel via a connecting mechanism. This connecting mechanism allows the device to be removed from the jig while ensuring the access panel stays firmly attached to the jig. With the door attached to the jig, the user simply lifts the electronic device away from the jig, while the access panel or housing portion remains attached to the jig system.

By way of non-limiting example, a user may place their device (e.g., laptop, tablet, smartphone, etc.) into the jig. Due to the jig's dimensions, the device may only be able to be inserted in one orientation (i.e., the correct orientation). Once inserted, a user may then slide the device or jig (e.g., in a straight line or predetermined pattern) to open the latches. This action allows all of the latches to operate simultaneously with a single action.

Accordingly, an embodiment provides a system that enables a user to easily disassemble (e.g., remove a cover or access panel from) an electronic device. Therefore, an embodiment may allow a user to more quickly and easily upgrade or repair an electronic device. A further embodiment may also comprise a jig which has a plurality of mechanisms that interact with the locking mechanisms of the device to further improve the process of disassembly.

The illustrated example embodiments will be best understood by reference to the figures. The following description is intended only by way of example, and simply illustrates certain example embodiments.

Figure 1:
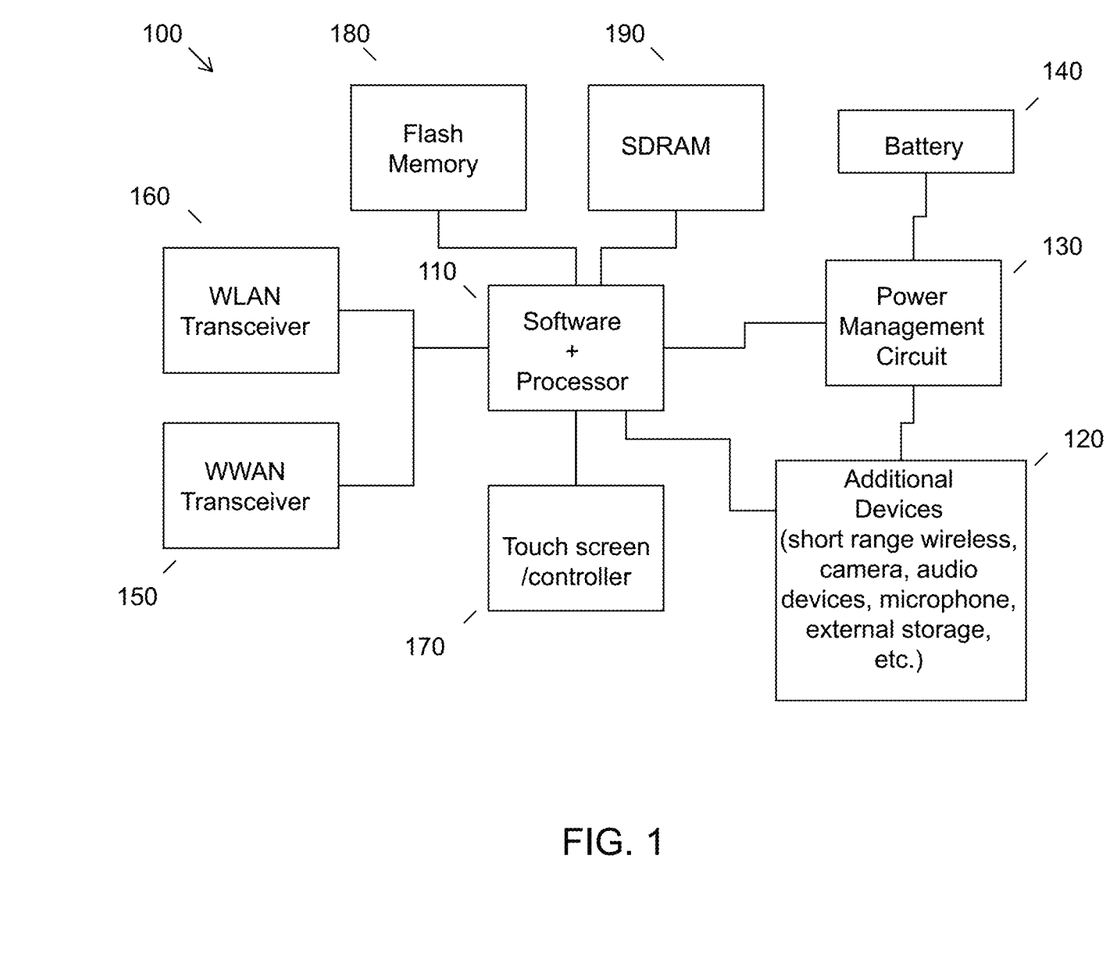
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included. System 100 often includes a touch screen 170 for data input and display/rendering. System 100 also typically includes various memory devices, for example flash memory 180 and SDRAM 190.

Figure 2:
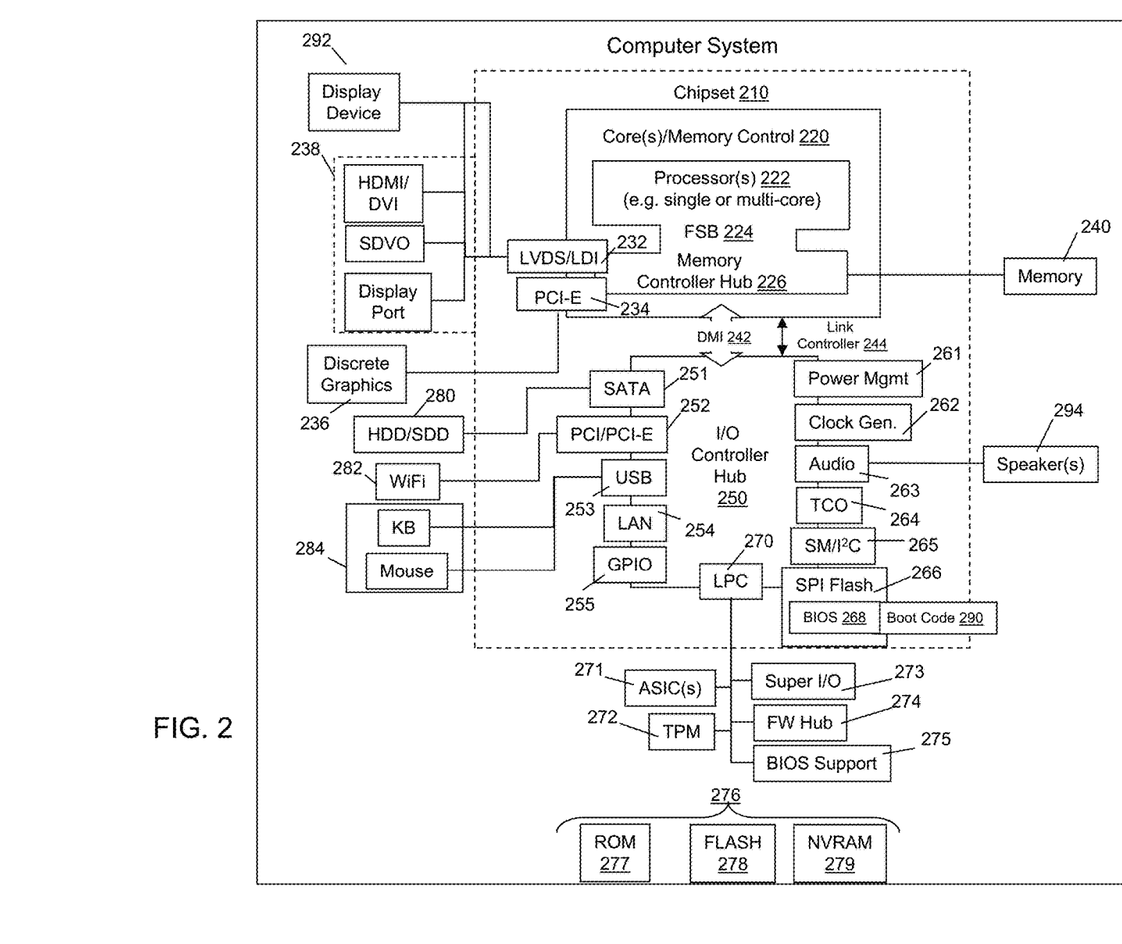
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAIVI 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may need to upgrade or repair via accessing the internal components of the electronic device. For example, the circuitry outlined in FIG. 1 may be implemented in a tablet or smart phone embodiment, whereas the circuitry outlined in FIG. 2 may be implemented in a personal computer embodiment.

Figure 3:
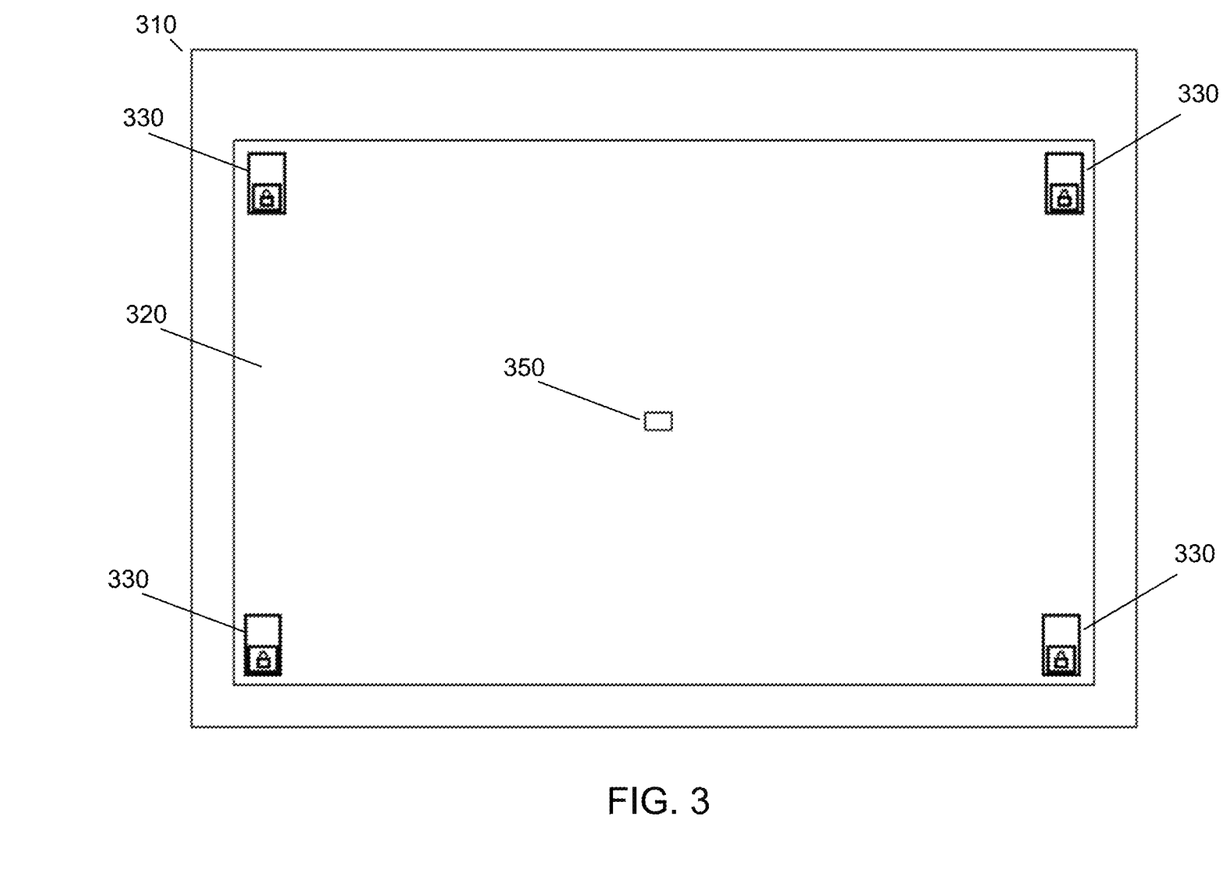
FIG. 3 illustrates an example electronic device with an access panel.

Referring now to FIG. 3, an example embodiment of an electronic device (e.g., information handling device) is shown, although the electronic device may be, as discussed herein, any form of information handling device. For simplicity purposes the general discussion herein will relate to a laptop computer. In one embodiment, the electronic device may have a housing 310, which contains and protects the sensitive electronic equipment that makes up the device. The housing 310 may be constructed of plastic, metal, metal alloy, or any suitable material with proper weight to strength ratio to allow the device to be mobile.

In one embodiment, the housing 310 may be composed of at least two portions connected via fastening mechanisms (collectively referred to using reference numeral 330). Additionally or alternatively, an embodiment may comprise a housing 310 that is a single piece with an access panel 320 that can be removed or opened to access the components inside the housing 310. Additionally, an embodiment may utilize a combination of the foregoing.

Generally, laptop housings may comprise two parts connected via a hinge system. Of the two parts, the lower portion (e.g., the portion containing a keyboard) is generally where the majority of computer components are located. However, as should be understood by one skilled in the art, the removable portion of the housing 320 or access panel 320 may be applicable to both the base (e.g., keyboard section) and upper (e.g., monitor section) portion of the laptop. As the line between laptop and tablet softens, more and more computer components are likely to be housed in the display portion of a laptop or even desktop computer. Thus, one embodiment may have an access panel 320 or removable portion on both the upper and lower section of the laptop.

In an embodiment, the access panel 320 or removable portion may comprise one or more locking mechanisms at 330 to secure the panel or housing portion 310 to the electronic device proper. Although the locking mechanisms 330 are shown at the corners of the electronic device in FIG. 3, it should be understood that FIG. 3 is only a single, non-limiting example. Various embodiments may have the locking mechanisms 330 arranged in a different patterns, different numbers, different types, etc., in order to allow for different unlocking procedures. By way of example, the locking mechanisms 330 are arranged such that sliding a portion of each of the mechanisms in a direction (e.g., up) would unlock the access panel 320 from the device. Alternately, an embodiment may arrange the locking mechanisms 330 in an angular or circular pattern, which would require a specific user interaction to unlock.

By way of non-limiting example, embodiments may place the locking mechanisms 330 in a spiral or circular pattern. Arranging the locking mechanisms 330 in a circular pattern may require a user to twist the electronic device in a clockwise (or counter-clockwise) direction about an apparatus designed to slide the mechanisms 330 simultaneously. In a further embodiment, the locking mechanisms 330 may be constructed in any fashion as to allow the secure attachment of the removal housing portion 310 or access panel 320 from the electronic device.

For example, an embodiment may utilize a magnetic locking mechanism 330. The use of a magnetic locking mechanism 330 may allow the surface of the device appear flush, thus potentially improving the aesthetics of the device. The magnetic locking mechanism 330 may comprise a mechanism that when introduced to a magnetic field simply unlocks due to an attraction of a pin (or the like) withdrawing from locked position responsive to the pull of the magnet. In one embodiment, the magnetic locking mechanism 330 may require the magnet to be moved in a predetermined pattern, such as: sliding in a direction, sliding in multiple different directions, sliding in multiple directions for specific distances, sliding in a circular or oval pattern, or sliding the magnet in any predetermined pattern or shape. Thus, an embodiment could act in a manner similar to a combination lock requiring a particular set of movements in one or more particular directions for particular distances.

Additionally or alternatively, an embodiment may utilize one or more mechanical locking mechanisms 330. Using mechanical locking mechanisms 330 may allow a device to be more robust or simpler to operate. The mechanical locking mechanisms 330 may comprise various spring, weighted, interlocking, sliding, spinning mechanisms, or the like. Similar to the magnetic locking mechanism 330, the mechanical locking mechanisms 330 may also require an object to be moved in a predetermined pattern such as: sliding in a direction, sliding in multiple different directions, sliding in multiple different directions for specific distances, sliding in a circular or oval pattern, or sliding the magnet in any predetermined pattern or shape. Again, an embodiment may, using the mechanical locking mechanisms 330, act in a manner similar to a combination lock requiring a particular set of movements in one or more particular directions for a particular distance.

In a further embodiment, the locking mechanisms 330 (regardless of type) may need to be activated one at a time. In another embodiment, the locking mechanisms 330 may need to be activated in a particular order. For example, an embodiment may require the locking mechanisms 330 to be operated one at a time in a specific order, further increasing security. Another embodiment may require the locking mechanisms 330 to be activated simultaneously (substantially simultaneously) in order to unlock the access panel 320 or housing portion 310. Operation of a plurality of locking mechanisms 330 simultaneously may be an extremely difficult task for an individual if there are a large number of locking mechanisms 330. Thus, instead of a user attempting to unlock each locking mechanism 330 manually (e.g., with his or her hands), an embodiment may include an apparatus to enable easier unlocking.

Figure 4:
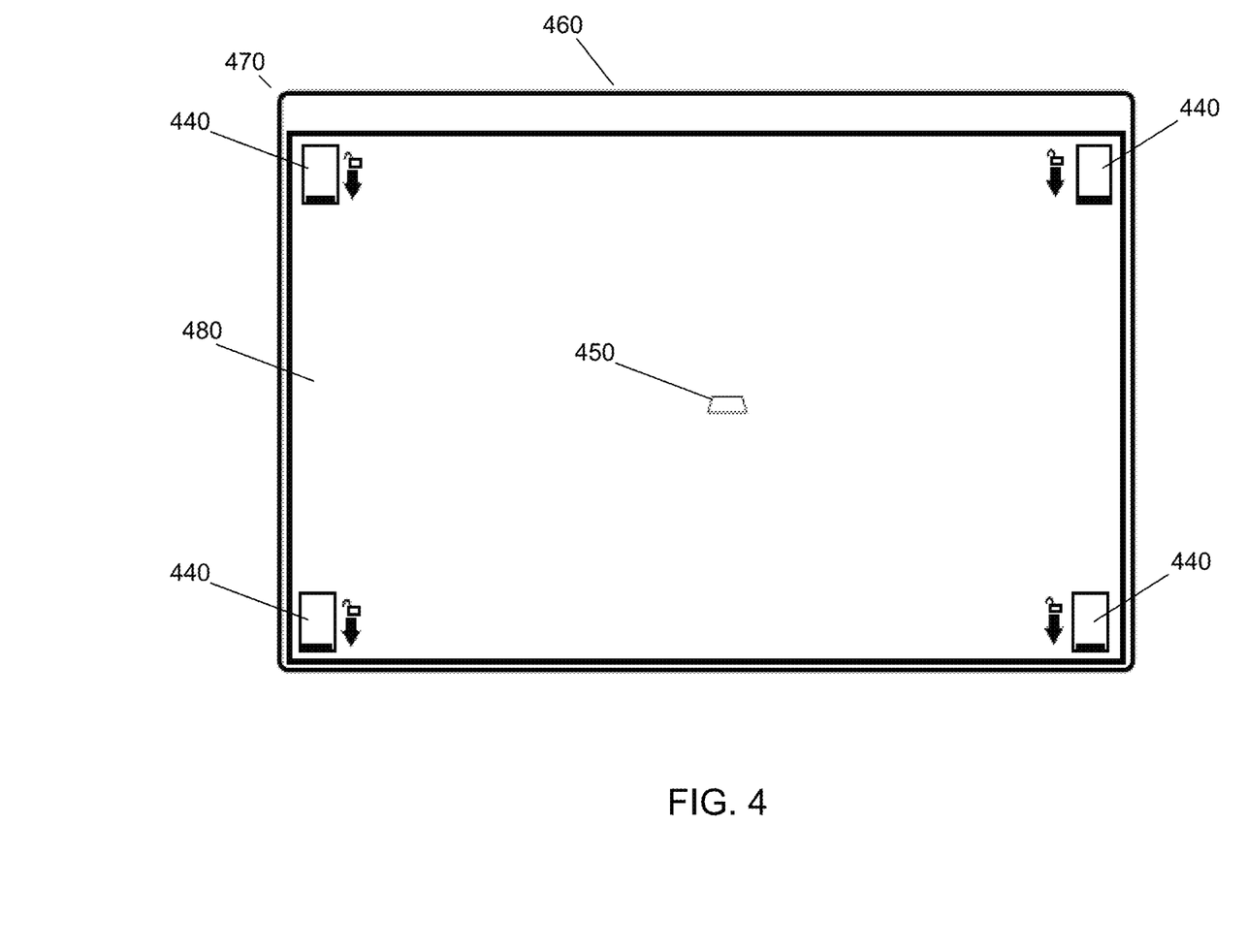
FIG. 4 illustrates an example jig.

Referring now to FIG. 4, an embodiment may comprise an apparatus or jig at 470. The jig 470 may comprise a base portion at 480, the base portion may also have one or more walls at the edge the base at 460 (also at 560 in FIG. 5). The base may be constructed out of a plastic, wood, metal or metal alloy, or any substance that can provide the structural strength to enable unlocking the locking mechanisms 330 on the electronic device as discussed herein.

In one embodiment, the base portion may also comprise a plurality of unlocking mechanisms at 440. Although the unlocking mechanisms 440 are shown at the corners of the apparatus (e.g., jig 470) in FIG. 4, it should be understood that FIG. 4 is only a single, non-limiting example. Various embodiments may have the unlocking mechanisms 440 arranged in a different pattern in order to allow for different unlocking procedures. By way of example, the unlocking mechanisms 440 are arranged such that they can catch a portion of each corresponding locking mechanism 330, located on the electronic device, and slide that portion in a direction (e.g., up) to unlock the access panel 320 or housing section 310 from the device. Similar to the locking mechanisms 330 discussed herein, an embodiment may also arrange the unlocking mechanisms 440 in an angular or circular pattern, which would require a specific motion to unlock.

By way of non-limiting example, embodiments may place the unlocking mechanisms 440 (which correspond to a known locking mechanism 330 pattern) in a spiral or circular pattern. Arranging the locking mechanisms 330 in a circular pattern may require a user to twist the jig 470 in a clockwise (or counter-clockwise) direction with respect to the electronic device to slide the unlocking mechanisms 440 simultaneously or in a predetermined order. In a further embodiment, the locking mechanisms 330 and unlocking mechanisms 440 may be constructed in any fashion as to allow the removal of a portion of the housing 310 or access panel 320.

Again, similar to the locking mechanisms 330, the unlocking mechanisms 440 may be magnetic and/or mechanical in nature. Similar to the locking mechanisms 330, the magnetic/mechanical unlocking mechanisms 440 may be arranged or designed in such a way as to require multiple movements, for a predetermined distance, or a combination of circular movements for a predetermined distance.

In a further embodiment, the unlocking mechanisms 440 may be removed or relocated on the jig 470. The relocation or removal of unlocking mechanisms 440 allows the jig 470 to be modified to fit various electronic devices. Thus, for example, if jig 470 is currently set up to unlock a laptop computer, a user may remove the unlocking mechanisms 440 and relocate them to enable the jig 470 to work with a tablet, which generally has smaller dimensions than a laptop computer. Additionally, some electronic devices may have more locking mechanisms 330 than others, so more or less unlocking mechanisms 440 may be required.

Additionally, an embodiment may adjust in overall size to accept different electronic devices of different sizes. By way of non-limiting example, an embodiment may have a sliding connector that connects a top and bottom portion of the jig 470 together. The sliding connector may then be adjusted to increase or decrease the distance between the top and bottom portion of the jig 470. Similarly, an embodiment may have a sliding connector that connects a left and right side. The connector, as before, may allow the left and right sides to be arranged closer together or farther apart based on the size of the electronic device a user desires to unlock.

Figure 5:
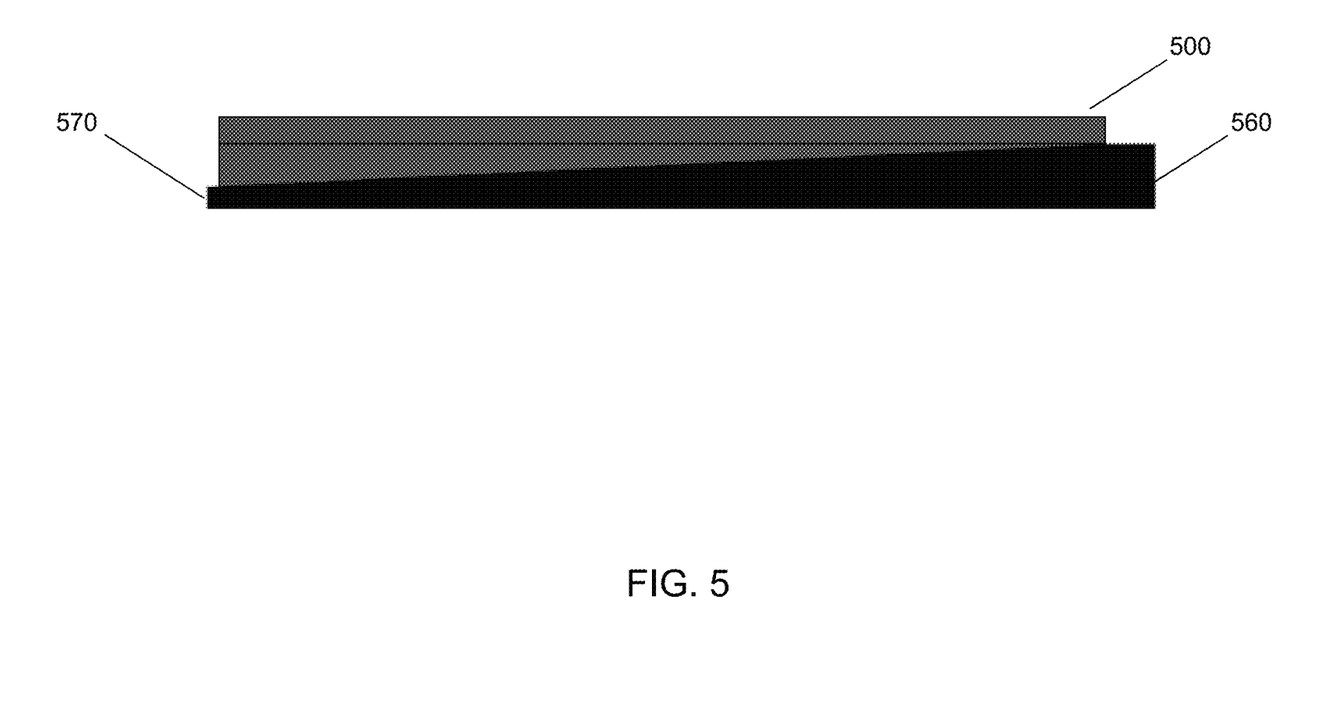
FIG. 5 illustrates a side view of an example of the electronic device as combined with the jig.

Referring to FIG. 5, an example embodiment is shown where the electronic device at 500 and the jig (i.e., apparatus) at 570 are combined. By way of non-limiting example, an embodiment may allow a laptop computer to rest within the jig 570 prior to or after the unlocking process (e.g., rotation or movement in a predetermined pattern) has taken place.

In a further embodiment, the electronic device 500 and the jig 570 may have corresponding fastening mechanisms (e.g., 350 of FIG. 3 and 450 of FIG. 4). The fastening mechanism 350, 450 may be located in any corresponding locations on the devices. By way of non-limiting example, FIG. 3 and FIG. 4 show the fastening devices 350, 450 located in the center of each respective device. In one embodiment, the fastening mechanisms 350, 450 interact with each other when the electronic device 500 is placed within the jig 570. The fastening mechanisms 350, 450 may attach to each other such that when the electronic device 500 is removed from the jig 570, the access panel 320 or portion of the housing 310 stays attached to the jig 570. This allows for easy reattachment of the access panel 320 once the upgrade/repair is complete on the electronic device 500 without the burden of realignment of the access panel 320 or reattachment of the jig 570 to the device 500 and/or access panel 320.

Accordingly, as illustrated by the example embodiments and figures, an embodiment provides a system for securing and/or removing a portion of a housing of an electronic device simply and easily. Instead of screws, an embodiment uses magnetic or mechanical locking mechanisms to ensure all portions of the housing remain connected together. To increase security and reduce potential accidents, the locking mechanisms may require a specific pattern or movement to unlock. Additionally, the mechanisms may require that the unlocking pattern be executed on each locking mechanism at the same time. Thus, an embodiment provides an apparatus or jig which allows a user to interact with each locking mechanism simultaneously while only preforming the action using the jig.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device, comprising:
   a housing, the housing comprising an access panel, wherein the access panel provides access to an internal component of the information handling device;
   the access panel comprising a plurality of locking mechanisms, wherein each of the plurality of locking mechanisms are located at least partially on an exterior surface of the access panel;
   wherein removal of the access panel requires manipulating, with an unlocking apparatus, each of the plurality of locking mechanisms to move in an identical, predetermined slide pattern substantially simultaneously.

2. The information handling device of claim 1, wherein the plurality of locking mechanisms comprise magnetic locking mechanisms.

3. The information handling device of claim 1, wherein the plurality of locking mechanisms comprise mechanical locking mechanisms.

4. The information handling device of claim 1, wherein activating each of the plurality of locking mechanism substantially simultaneously further comprises moving each of the plurality of locking mechanisms in a predetermined pattern substantially simultaneously.

5. The information handling device of claim 1, wherein the information handling device is connectable to a base, the base comprising a plurality of unlocking mechanisms; and
wherein combining the base and the information handling device unlocks the access panel.

6. The information handling device of claim 5, wherein the plurality of unlocking mechanisms are arranged complementary to the pattern of the plurality of locking mechanisms.

7. The information handling device of claim 5 further comprising: a first fastening mechanism disposed on the access panel; and
a second fastening mechanism disposed on the base;
wherein, in response to the base being attached to the information handling device, the first and second fastening mechanism are connected.

8. The information handling device of claim 7, wherein the access panel remains connected to the base as the information handling device is separated from the base.

9. The information handling device of claim 5, wherein said combining further comprises at least one of: activating each of the plurality of unlocking mechanism in a predetermined order and sliding the information handling device in a predetermined pattern.

10. The information handling device of claim 1, wherein the information handling device comprises at least one of: a laptop computer, a tablet, a smart phone, and a desktop computer.

11. An information handling device, comprising:
a housing, the housing comprising a first portion and a second portion;
the second portion comprising a plurality of locking mechanisms, wherein each of the plurality of locking mechanisms are located at least partially on an exterior surface of the second portion and wherein the second portion provides access to an internal component of the information handling device;
wherein removal of the second portion requires manipulating, with an unlocking apparatus, each of the plurality of locking mechanisms to move in an identical, predetermined slide pattern substantially simultaneously.

12. The information handling device of claim 11, wherein the plurality of locking mechanisms comprise magnetic locking mechanisms.

13. The information handling device of claim 11, wherein the plurality of locking mechanisms comprise mechanical locking mechanisms.

14. The information handling device of claim 11, wherein activating each of the plurality of locking mechanism substantially simultaneously further comprises moving each of the plurality of locking mechanisms in a predetermined pattern substantially simultaneously.

15. The information handling device of claim 11, wherein the information handling device is connectable to a base, the base comprising a plurality of unlocking mechanisms; and
wherein combining the base and the information handling device unlocks the second portion.

16. The information handling device of claim 15, wherein the plurality of unlocking mechanisms are arranged complementary to the pattern of the plurality of locking mechanisms.

17. The information handling device of claim 15 further comprising: a first fastening mechanism disposed on the second portion; and
a second fastening mechanism disposed on the base;
wherein, in response to the base being attached to the second portion, the first and second fastening mechanism are connected.

18. The information handling device of claim 17, wherein second portion remains connected to the base as the information handling device is separated from the base.

19. The information handling device of claim 15, wherein said combining further comprises at least one of: activating each of the plurality of unlocking mechanism in a predetermined order and sliding the information handling device in a predetermined pattern.

20. A method, comprising:
forming a housing comprising an access panel, wherein the access panel provides access to an internal component of an information handling device; and
attaching the access panel to the housing via a plurality of locking mechanisms, wherein each of the plurality of locking mechanisms are located at least partially on an exterior surface of the access panel;
wherein removal of the access panel requires manipulating, with an unlocking apparatus, each of the plurality of locking mechanisms to move in an identical, predetermined slide pattern substantially simultaneously.

* * * * *